(12) United States Patent
Shih

(10) Patent No.: US 10,514,061 B2
(45) Date of Patent: Dec. 24, 2019

(54) LINEAR MOVING BEARING

(71) Applicant: John Wun-Chang Shih, Hsinchu (TW)

(72) Inventor: John Wun-Chang Shih, Hsinchu (TW)

(*) Notice: Subject to any disclaimer, the term of this patent is extended or adjusted under 35 U.S.C. 154(b) by 0 days.

(21) Appl. No.: 15/986,811

(22) Filed: May 23, 2018

(65) Prior Publication Data

US 2019/0360525 A1 Nov. 28, 2019

(51) Int. Cl.
*F16C 29/00* (2006.01)
*F16C 29/02* (2006.01)
*F16C 29/08* (2006.01)
*B60N 2/07* (2006.01)
*B60N 2/06* (2006.01)

(52) U.S. Cl.
CPC ............ *F16C 29/02* (2013.01); *F16C 29/005* (2013.01); *F16C 29/084* (2013.01); *B60N 2/06* (2013.01); *B60N 2/07* (2013.01); *B60N 2/0727* (2013.01)

(58) Field of Classification Search
CPC ...... F16C 29/005; F16C 29/02; F16C 29/084; B60N 2/06; B60N 2/07; B60N 2/0717; B60N 2/0727; B60N 2/0862; B25J 5/02
USPC ...... 384/7, 10, 20–21, 26, 42; 248/424, 429; 297/344.11
See application file for complete search history.

(56) References Cited

U.S. PATENT DOCUMENTS

| | | | | |
|---|---|---|---|---|
| 4,109,973 A | * | 8/1978 | Terada | B60N 2/0705 248/430 |
| 4,152,961 A | * | 5/1979 | Batson | B23D 45/024 83/471.3 |
| 5,046,698 A | * | 9/1991 | Venier | B60N 2/071 248/429 |
| 5,582,381 A | * | 12/1996 | Graf | B60N 2/071 248/430 |
| 6,264,159 B1 | * | 7/2001 | Su | B60N 2/0705 248/430 |
| 9,027,899 B2 | * | 5/2015 | Haller | B60N 2/0705 248/424 |
| 2001/0013570 A1 | * | 8/2001 | Yoshida | B60N 2/071 248/429 |
| 2008/0193062 A1 | * | 8/2008 | Ropp | B60N 2/075 384/34 |
| 2011/0007988 A1 | * | 1/2011 | Huang | F16C 29/02 384/20 |

(Continued)

FOREIGN PATENT DOCUMENTS

| | | | | |
|---|---|---|---|---|
| CN | 203390505 U | * | 1/2014 | ............ B23P 19/027 |
| CN | 203743799 U | * | 7/2014 | ............... F16N 9/04 |

(Continued)

*Primary Examiner* — Marcus Charles

(57) ABSTRACT

A linear moving bearing, comprising: a retaining portion having at least one receiving chambers at lateral sides thereof; each receiving chamber being installed with at least one set of sliding track which is formed by two round rods; each of receiving chamber formed with two stop walls at an upper and lower ends of an opening of the receiving chamber; the stop walls serving to retain the round rods in the receiving chamber; each of the set of the sliding track resisting against a sliding rod so that the round rod being slidable along the sliding track. The stop walls are screwed or buckled to an upper and a lower end of a lateral wall aside the opening of the receiving chamber. The sliding rod has a sharp angle resists against a middle area between the two round rods of a set of the sliding track.

9 Claims, 4 Drawing Sheets

(56) References Cited

U.S. PATENT DOCUMENTS

2012/0074289 A1* 3/2012 Kimura ................ B60N 2/0705
248/430

FOREIGN PATENT DOCUMENTS

| CN | 206643813 U | * | 11/2017 | ............. | B25B 11/00 |
| DE | 20316693 U1 | * | 2/2004 | ........... | F15B 15/1471 |
| EP | 1013457 A1 | * | 6/2000 | ............. | B41J 19/00 |
| KR | 20020066665 A | * | 8/2002 | ............. | B41J 19/00 |

* cited by examiner

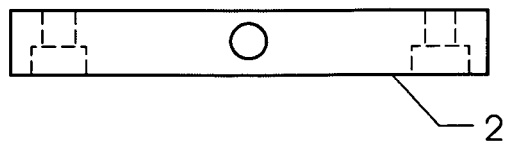
FIG. 4
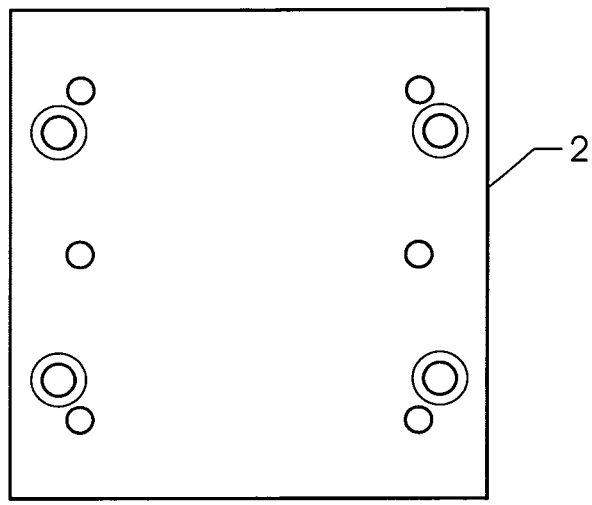
FIG. 2
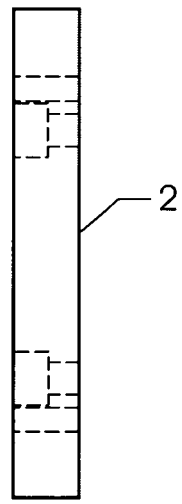
FIG. 3
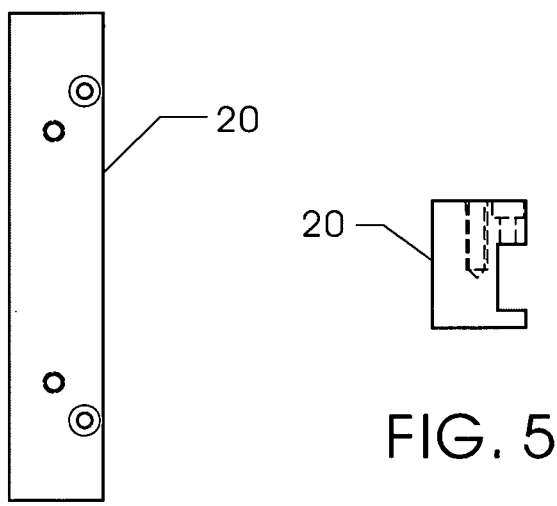
FIG. 6
FIG. 5

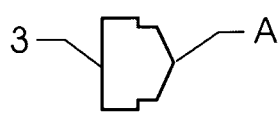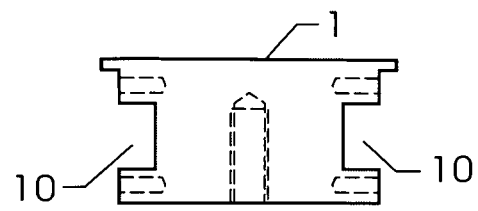
FIG. 7    FIG. 9    FIG. 11
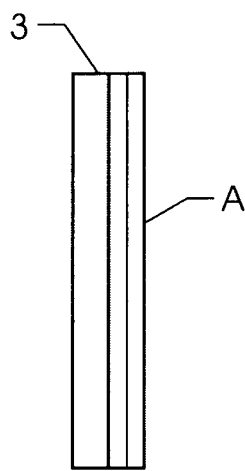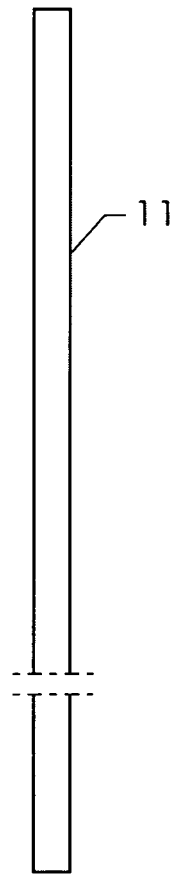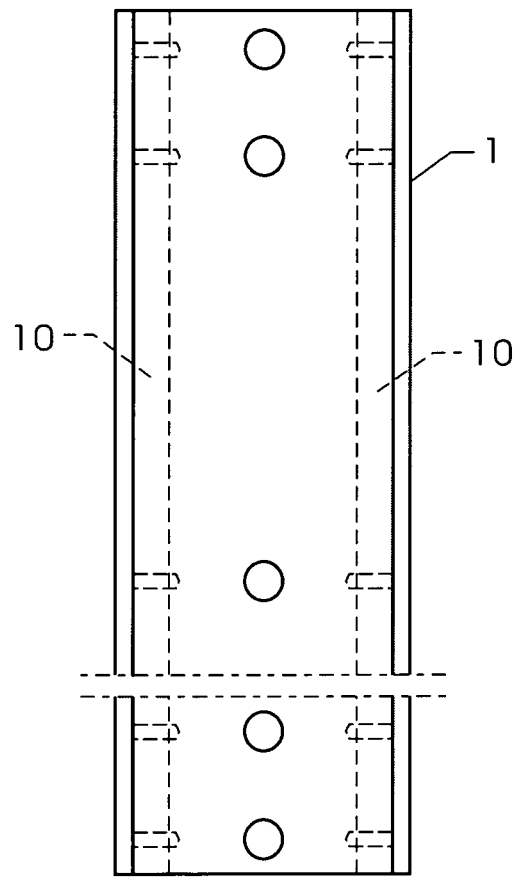
FIG. 8    FIG. 10    FIG. 12

LINEAR MOVING BEARING

FIELD OF THE INVENTION

The present invention is related to linear moving bearings, and in particular to a linear moving bearing.

BACKGROUND OF THE INVENTION

In the prior art linear bearing, round balls are used to rotatably bear the retaining portion and movable portion of the bear. However, all the Prior arts about linear bearings have complicated structure and higher cost. Furthermore the maintenance and lubrication works are difficult. When any rolling ball is worn or deformed, it will affect the liner motion. Furthermore ratio of malfunction is increased with the number of the rolling balls. Therefore, the lifetime of the linear bearing is short. When any rolling ball is destroyed, it is difficult to repair. As a result, a whole linear bearing is updated, but it is waste and uneconomic.

Therefore, inventor of the present invention is aimed to improve the above mentioned defects about the linear bearing to have a simple structure and to be low cost, can be easily maintained and lubricated.

SUMMARY OF THE INVENTION

Accordingly, the object of the present invention is to provide a linear moving bearing, wherein a moving portion and a retaining portion of a linear moving bearing are worn linearly and thus it has a higher endurance. The structure is easy and has a low cost. The maintenance and updating works are easy with a higher endurance so as to increase the lifetime of the linear moving bearing. If the round rod 11 or sliding rod 3 is worn, they can be updated easily and quickly. When the sliding rod 3 is worn, the angle thereof can be adjusted so that the whole lifetime of the sliding rod 3 is prolonged.

To achieve above object, the present invention provides a linear moving bearing, comprising: a retaining portion having at least one receiving chambers at lateral sides thereof; each receiving chamber being installed with at least one set of sliding track which is formed by two round rods; each of receiving chamber formed with two stop walls at an upper and lower ends of an opening of the receiving chamber; the stop walls serving to retain the round rods in the receiving chamber; each of the set of the sliding track resisting against a sliding rod so that the round rod being slidable along the sliding track. The stop walls are screwed or buckled to an upper and a lower end of a lateral wall aside the opening of the receiving chamber.

The sliding rod has a sharp angle resists against a middle area between the two round rods of a set of the sliding track. The sharp angle is between 80 degrees to 130 degrees, or 120 or 90 degrees. Or the sliding rod has a rectangular cross section or has at least two sharp angles.

BRIEF DESCRIPTION OF THE DRAWINGS

FIG. 2 shows the base of the movable portion of the present invention.

FIG. 3 is a right side view of FIG. 2.

FIG. 4 is an elevation view of FIG. 2.

FIG. 5 shows the seats of the movable portion of embodiment shown in FIG. 1.

FIG. 6 is an elevation view of FIG. 5.

FIG. 7 shows the round rods of the movable portion in the embodiment shown in FIG. 1.

FIG. 8 is an elevation view of FIG. 7.

FIG. 9 shows the round rod in the retaining portion of the embodiment of the present invention.

FIG. 10 is an elevation view of FIG. 9.

FIG. 11 shows the retaining portion of the embodiment of the present invention.

FIG. 12 is an elevation view of FIG. 11.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
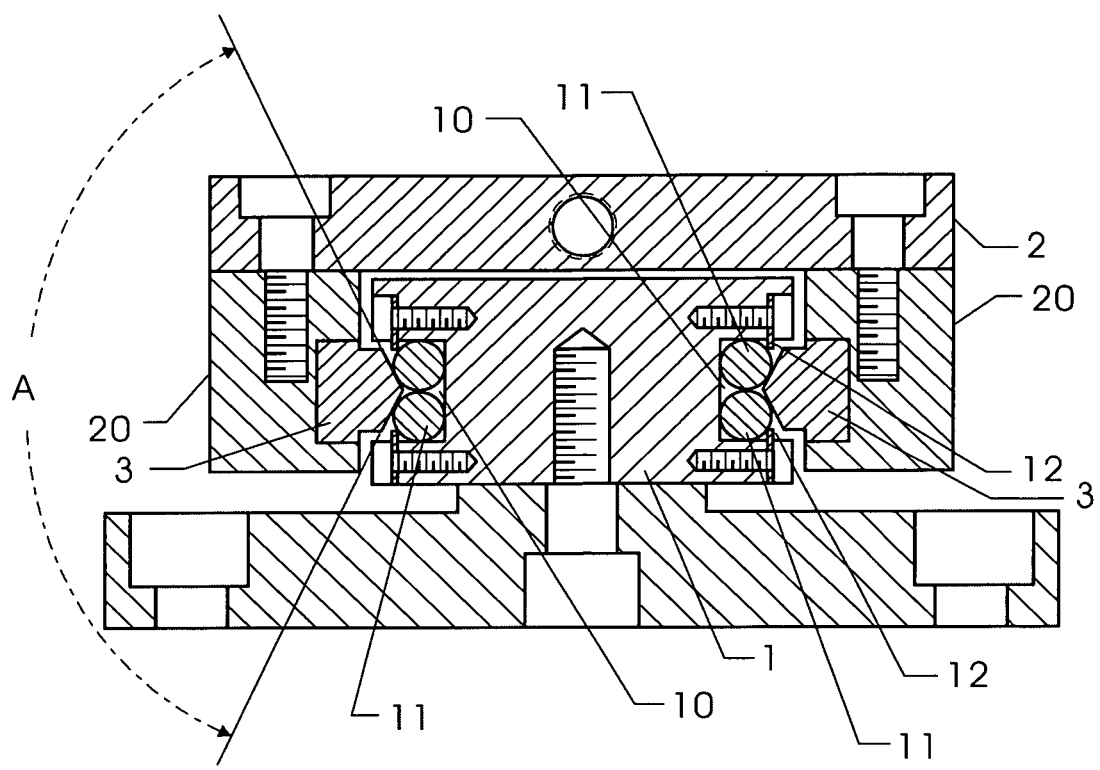
FIG. 1 is a schematic view about the present invention of the present invention.

With reference to FIGS. 1 to 14, especially referring to FIGS. 1, 11 and 12, the structure of the present invention is illustrated. The linear bearing of present invention includes the following elements.

A retaining portion 1 has two receiving chambers 10 at two sides thereof. Each receiving chamber 10 is installed with at least one set of sliding track which is formed by two round rods 11 (referring to FIGS. 1, 9 and 10).

Each of receiving chamber 10 is formed with two stop walls 12 at an upper and lower ends of an opening of the receiving chamber 10. The stop walls 12 serves to retain the round rods 11 in the receiving chamber 10.

Each of the set of the sliding track resists against a sliding rod 3 so that the round rod 11 is slidable along the sliding track.

With reference to FIG. 1, the stop walls 12 are screwed to an upper and a lower end of a lateral wall aside the opening of the receiving chamber 10.

Figure 14:
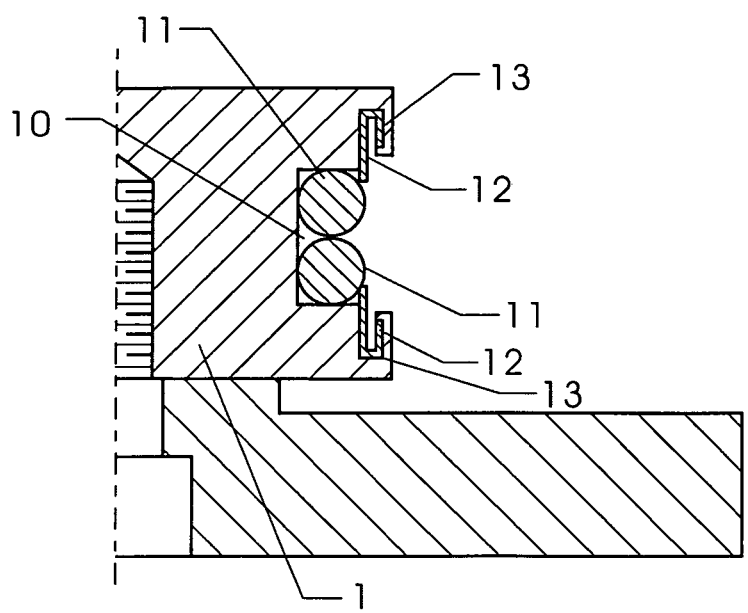
FIG. 14 is another embodiment about the positioning of the sliding track according to the present invention.

With reference to FIG. 14, the stop walls 12' are bucked to buckling trenches 13 at an upper and a lower end of a lateral wall aside the opening of the receiving chamber 10.

However, the ways for retaining the stop walls 12 are not confined to above mentioned two ways, other ways which achieve the object of retaining the stop walls 12 are within the scope of the present invention.

With reference to FIGS. 1, 2 and 8, the linear bearing of the present invention includes a movable portion which includes a base 2 and two seats 20 fixed to two sides of the base 2. The retaining portion 1 is installed between the two seats 20 and under the base 2. A middle section of seat 20 is installed with the sliding rod 3 which resists against the two round rods 11 of a respective sliding track. The sliding rod 3 has a sharp angle A resists against a middle area between the two round rods 11 of a set of the sliding track. The sharp angle A is between 80 degrees to 130 degrees. FIG. 1 shows that the sharp angle A is 120 degrees.

Figure 13:
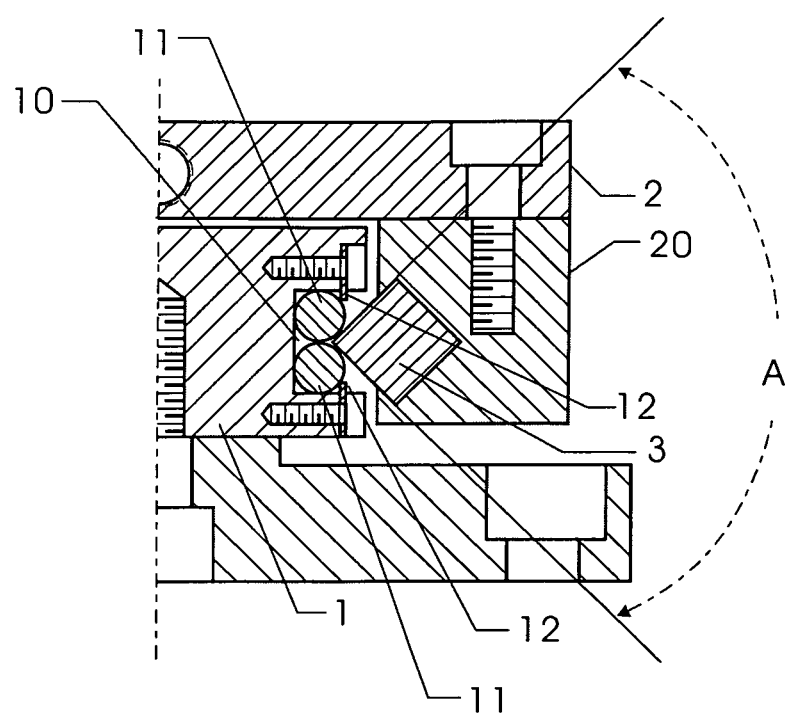
FIG. 13 is an assembled schematic view of another embodiment of the sliding rod of the movable portion in the present invention.

Another example the sliding rod 3 of the movable portion in the first embodiment of the present invention is illustrated in FIG. 13. It is illustrated that the sharp angle A is 90 degrees. In FIG. 13, the sliding rod 3' has a rectangular cross section, however, other polygonal cross section is suitable in this example, or the sliding rod 3 has at least two sharp angles A. This design is beneficial that the sliding rod 3' can be rotated along its axis so that another sharp angle A to resist against the sliding track as one sharp angle A is worn. Therefore, the lifetime of the sliding rod 3' is prolonged.

The affect of the present invention is that by using the sharp angle A of the sliding rod 3, 3' to resist against an area between the two round rods 11 of a sliding track, which has the advantages that: The moving portion and retaining portion of a linear moving bearing are worn linearly and thus it has a higher endurance. The structure is easy and has a low cost. The maintenance and updating works are easy with a higher endurance so as to increase the lifetime of the linear moving bearing. If the round rod 11 or sliding rod 3, 3' is worn, they can be updated easily and quickly. When the sliding rod 3, 3' is worn, the angle thereof can be adjusted so that the whole lifetime of the sliding rod 3 is prolonged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A linear moving bearing, comprising:
   a retaining portion having at least one receiving chamber at lateral sides thereof; each receiving chamber being installed with at least one set of sliding track which is formed by two round rods (11);
   each of receiving chamber formed with two stop walls at an upper and lower ends of an opening of the receiving chamber; the stop walls serving to retain the round rods in the receiving chamber; and
   each of the set of the sliding track resisting against a sliding rod so that the sliding rod (3) being slidable along the sliding track (11).

2. The linear moving bearing as claimed in claim 1, wherein the stop walls are screwed to an upper and a lower end of a lateral wall aside the opening of the receiving chamber.

3. The linear moving bearing as claimed in claim 1, wherein the stop walls are bucked to buckling trenches at an upper and a lower end of a lateral wall aside the opening of the receiving chamber.

4. The linear moving bearing as claimed in claim 1, wherein the sliding rod resists against the two round rods of the sliding track; and the sliding rod has a sharp angle resists against a middle area between the two round rods of a set of the sliding track.

5. The linear moving bearing as claimed in claim 4, wherein the sharp angle is between 80 degrees to 130 degrees.

6. The linear moving bearing as claimed in claim 4, wherein the sharp angle is 120 degrees.

7. The linear moving bearing as claimed in claim 4, wherein the sharp angle is 90 degrees.

8. The linear moving bearing as claimed in claim 1, wherein the sliding rod has a rectangular cross section.

9. The linear moving bearing as claimed in claim 1, wherein the sliding rod has at least two sharp angles.

* * * * *